R. E. HELLMUND.
CONTROL SYSTEM.
APPLICATION FILED DEC. 18, 1914. RENEWED FEB. 2, 1918.

1,277,415.

Patented Sept. 3, 1918.

WITNESSES:
R. J. Fitzgerald
W. R. Coley

INVENTOR
Rudolf E. Hellmund.
BY
Chesley G. Carr
ATTORNEY

UNITED STATES PATENT OFFICE.

RUDOLF E. HELLMUND, OF PITTSBURGH, PENNSYLVANIA, ASSIGNOR TO WESTING-HOUSE ELECTRIC AND MANUFACTURING COMPANY, A CORPORATION OF PENNSYLVANIA.

CONTROL SYSTEM.

1,277,415.  Specification of Letters Patent.  Patented Sept. 3, 1918.

Application filed December 18, 1914, Serial No. 877,884. Renewed February 2, 1918. Serial No. 215,226.

*To all whom it may concern:*

Be it known that I, RUDOLF E. HELLMUND, a subject of the German Emperor, and a resident of Pittsburgh, in the county of Allegheny and State of Pennsylvania, have invented a new and useful Improvement in Control Systems, of which the following is a specification.

My invention relates to systems of control for electric motors, and it has special reference to phase-regulating systems for induction motors and the like.

In control systems of the type in question, namely, those comprising induction motors driven from alternating-current circuits and a phase-advancing machine connected to the secondary winding of the induction motor and coupled to an auxiliary driving motor that is fed from the supply circuit, difficulty has been experienced in obtaining sufficient phase-regulating effect at light loads without producing over-compensation under heavy load conditions. This statement is particularly true of the class of phase advancers that have no stator exciting winding. Ideal conditions may be approached to a certain degree by operating phase-advancers with relatively high flux densities, which, however, gives an effect that is undesirably limited in its range of operativeness.

The object of my invention is to provide means which shall be simple and inexpensive in construction and reliable and effective in operation, for automatically varying the phase compensation in induction motors in accordance with load conditions thereof, whereby the proper value of compensation may be automatically obtained at all loads.

According to my invention, I connect a speed-controlling field magnet winding of the driving motor of the phase-advancer in series relation or otherwise with one or more phase windings of the primary winding of the induction motor, whereby the driving motor and the phase-advancer run at relatively high speeds at light loads and afford the requisite phase compensation, but operate at relatively low speeds under heavy load conditions, thereby preventing over-compensation in the induction motor.

Figure 1:
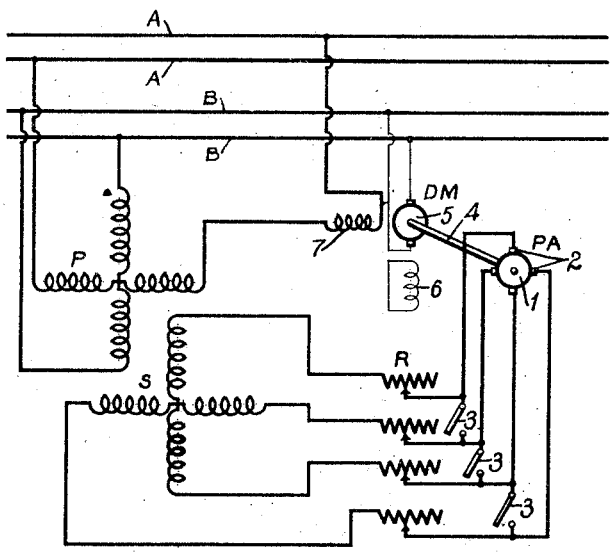
Figure 2:
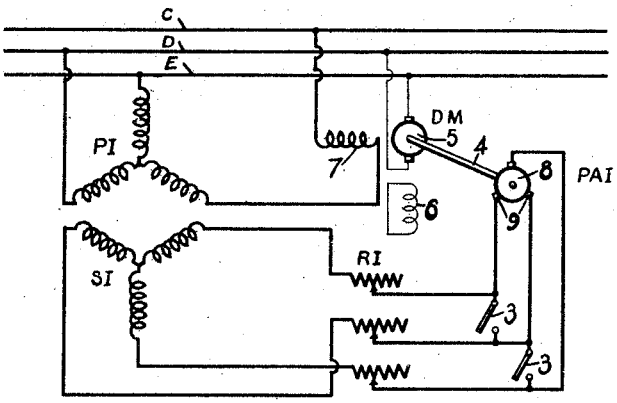
Figure 3:
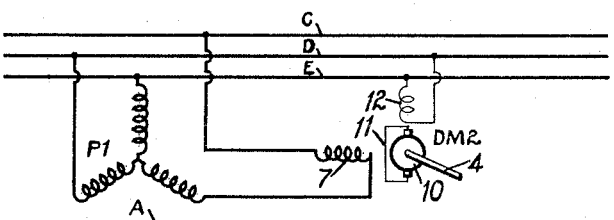
Figure 4:
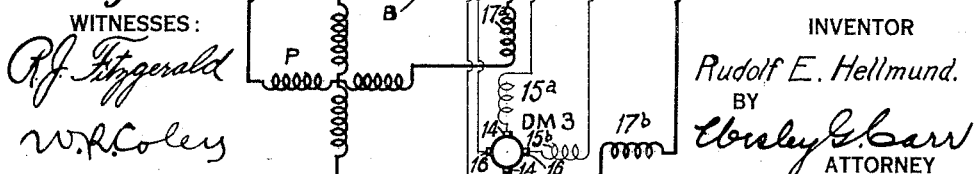

In the accompanying drawing, Figure 1 and Fig. 2 are similar diagrammatic views of two-phase and three-phase control systems, respectively, that embody my invention; and Figs. 3 and 4 are diagrammatic views of modifications of similar portions of the control systems shown in Fig. 2 and in Fig. 1, respectively.

Referring to Fig. 1, the system here shown comprises a four-wire, two-phase supply circuit having the phases AA, BB; an induction motor having its two-phase primary winding P suitably connected to the supply circuit and having a phase-wound secondary winding S; a regulating resistor R suitably connected in the secondary winding circuit; a phase advancer PA that is associated with the secondary winding S in a manner to be described; and an auxiliary driving motor DM for the phase advancer PA.

The phase advancer may be of any familiar type, such as the well-known phase-advancer having no stator exciting winding, and is provided with a rotatable armature member 1 upon the commutator cylinder of which a plurality of brushes 2 bear at the 90° points. A plurality of short-circuiting switches 3 are preferably disposed intermediate the phase advancer and the regulating resistor R to short circuit the phase-advancer under starting conditions of the induction motor. The driving motor DM may be coupled to the phase-advancer PA in any suitable manner, as by a shaft 4, and comprises a commutator-type armature 5 that is connected across the phase BB of the supply circuit; a short-circuited compensating winding 6 of a familiar type; and a main exciting field winding 7 that is connected in series with one of the phase windings of the primary winding P of the induction motor across the other phase AA of the supply circuit.

Inasmuch as the field winding 7 is highly inductive relative to the armature winding 5 of the driving motor, the exciting field current will lag approximately 90° behind the electromotive force of the phase AA, whereas the current flowing in the armature 5 will be nearly in phase with the electromotive force impressed upon the armature from the phase BB. The resultant excitation of the field winding 7 is thus approximately in phase with the armature current, and conditions are suitable for proper operation of the driving motor.

Assuming the machines shown to be at a stand-still, the operation of the system may be set forth as follows: The short-circuiting switches 3 are preferably initially closed to short-circuit the phase-advancer, while the induction motor is accelerated. The regulating resistor R is suitably connected in the secondary circuit to provide proper starting torque, in accordance with familiar practice. The primary winding P of the induction motor may then be connected to the supply circuit in accordance with any familiar practice to gradually bring the induction motor up to normal speed. The auxiliary driving motor DM may also be started into operation and brought up to speed in any suitable manner; and the short-circuiting switches 3 may then be opened to operatively connect the phase-advancer to the secondary winding S of the induction motor. Under light load conditions on the induction motor, it will be appreciated that the exciting field winding 7 of the driving motor carries a relatively small current and the speed of the motor is, consequently, relatively high. The phase-advancer, therefore, supplies a relatively high degree of phase compensation to the secondary winding circuit, and the design of parts may be such as to provide substantially the exact amount of phase compensation desired, as will be understood. On the other hand, under heavy load conditions on the induction motor, the current traversing the exciting field winding 7 of the driving motor is relatively large. The degree of compensation provided by the phase-advancer is thus maintained at a desirably low value, and over-compensation of the induction motor under heavy load conditions is effectively prevented.

Referring to Fig. 2, the system shown comprises a three-phase supply circuit having the phase conductors C, D, E; a three-phase induction motor having a primary winding P and a secondary winding $S^1$; a regulating resistor $R^1$, that is connected in the secondary winding circuit, as described in connection with Fig. 1; a three-phase phase-advancer $PA^1$ that is associated with the secondary winding $S^1$ in the usual manner; and the auxiliary driving motor DM.

The phase advancer $PA^1$ corresponds to the machine PA shown in Fig. 1, having a suitable armature 8 that is provided with a plurality of brushes 9 for appropriate connection with the respective phase windings of the secondary winding $S^1$. The driving motor DM has its armature 5 connected across the phase D, E, while the exciting field winding 7 has one terminal connected to the conductor C and the other terminal connected to one of the phase windings of the primary winding $P^1$. The design of the driving motor DM is such as to provide satisfactory operation with its rotor and stator windings connected as shown.

Inasmuch as the operation of the system shown in Fig. 2 corresponds exactly to that of the system illustrated in Fig. 1, no further exposition thereof is deemed necessary.

Reference may now be had to Fig. 3, wherein another type of driving motor $DM^2$ is illustrated. The driving motor $DM^2$ comprises the exciting field winding 7 that is connected to the primary winding $P^1$ of the induction motor in the same manner as that shown in Fig. 2; a commutator type armature winding 10 that is provided with a permanent short-circuiting conductor 11 and an auxiliary compensating winding 12 that is connected across the phase D, E, of the supply circuit, as was the armature 5 in the system illustrated in Fig. 2. This type of driving motor may be termed an indirectly-fed motor, inasmuch as the E. M. F. impressed upon the armature 10 is inductively transferred thereto through the agency of the compensating field winding 12.

The operation of the driving motor $DM^2$ under light and heavy load conditions, respectively, is similar to that described in connection with the driving motor DM that is illustrated in the other figures.

In case undersirable operating results are obtained in any case from possible unbalancing of the loads on the respective phases by reason of the inclusion of the auxiliary motor field winding in the circuit of only one phase winding of the induction motor, the system shown in Fig. 4 may advantageously be employed. The system in question may comprise the two-phase supply circuit AA, BB, the induction motor, and the phase-advancer PA, as illustrated in Fig. 1, the secondary winding S and the phase-advancer PA being omitted from the drawing for the sake of simplicity and convenience; and a driving motor $DM^3$.

The motor $DM^3$ is shown as comprising a two-phase commutator type armature 13, one set of oppositely-disposed brushes 14 of which is connected through a half-section $15^a$ of an auxiliary field winding across the phase AA of the supply circuit, and another set of brushes 16 that are disposed in quadrature relation to the brushes 14 is connected through the other half section $15^b$ of the auxiliary field winding to the phase BB; and a main or exciting field winding having its half-sections $17^a$ and $17^b$ connected to the phases AA and BB, respectively, through the corresponding phase windings of the induction motor primary winding P. The purpose of the main field windings $17^a$ and $17^b$ is to provide exciting current for the driving motor in accordance with the load currents carried by the primary windings of the induction motor, while the auxiliary field windings 15$^a$ and 15$^b$ function is to neutralize the magnetizing effect of armature reaction.

The operation of the system just described, considered in the light of the exposition relating to Fig. 1, is deemed sufficiently obvious to preclude the necessity of further explanation.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with an alternating current suppy-circuit, and an induction motor having a primary winding adapted for connection thereto and having a secondary winding, of a phase-advancer connected to said secondary winding, and a commutator motor for driving said phase-advancer, fed from said supply circuit and having a speed-varying field magnet winding excited in accordance with the load on the induction motor, whereby the proper values of phase compensation in the induction motor are automatically obtained at all loads.

2. In a power-factor control system for an induction motor, the combination with a secondary winding, of a rotary phase advancer connected thereto, a commutator motor for driving said phase advancer, and energizing means between the exciting-field-producing means of said commutator motor and the primary supply leads of said induction motor, whereby the exciting field and the speed of said commutator motor vary with the load on said induction motor.

3. The combination with a source of alternating current, of an induction motor of the wound secondary type, connections from said source to the primary winding of said motor, a phase converter, connections from the secondary winding of said motor to said phase converter, a driving motor of the alternating current commutator type mechanically coupled to said phase converter, means for energizing the armature winding of said commutator motor, and energizing means between the supply leads of said induction motor and the exciting-field-producing means of said driving motor, whereby the speed of the latter and consequently the angle of phase shift of said phase converter varies with the load on said induction motor.

4. The combination with a source of alternating current, of an induction motor of the wound secondary type, connections from said source to the primary winding of said motor, a phase converter, connections from the secondary winding of said motor to said phase converter, a driving motor of the alternating current commutator type mechanically coupled to said phase converter, connections from a portion of the windings of said driving motor to said source, and series type connections from other windings of said driving motor to the supply leads of said induction motor, whereby the speed of the latter and consequently the angle of phase shift of said phase converter varies with the load on said induction motor.

5. The combination with a source of alternating current, of an induction motor of the wound secondary type, connections from said source to the primary windings of said motor, a phase converter, connections from the secondary winding of said motor to said phase converter, a driving motor of the alternating current commutator type mechanically coupled to said phase converter, connections from the armature winding of said commutator motor to said source, and connections for inserting the main field winding of said commutator motor in one of the supply leads of said induction motor.

6. The combination with a dynamo-electric machine, of an auxiliary generator connected thereto and adapted to supply substantially wattless excitation only thereto, a driving motor for said auxiliary generator, and means for varying the voltage of said exciting means by automatically adjusting the speed of said driving motor in accordance with the load of said alternating current machine.

7. The combination with a dynamo-electric machine, of an auxiliary generator connected thereto and adapted to supply substantially wattless excitation only thereto, driving means for said auxiliary generator, and means for varying the voltage of said exciting means by automatically adjusting the speed of said driving means in accordance with the load of said alternating current machine.

8. In the combination with a main electric motor of an exciting generator therefor adapted to supply substantially a leading wattless excitation only thereto, a driving motor for said generator, and means for exciting the main field winding of said driving motor in accordance with the load of said main motor.

9. The combination with an induction motor of the wound secondary type, of an exciting generator connected to the secondary winding thereof, a driving motor of the alternating current commutator type therefor, means for exciting the main field winding of said driving motor in accordance with the load of said induction motor, and means for impressing a substantially constant electromotive force upon a working winding of said driving motor.

In testimony whereof, I have hereunto subscribed my name this 10th day of Dec. 1914.

RUDOLF E. HELLMUND.

Witnesses:
JOHN S. DEAN,
B. B. HINES.

Copies of this patent may be obtained for five cents each, by addressing the "Commissioner of Patents, Washington, D. C."